(12) United States Patent
Schuck et al.

(10) Patent No.: US 6,172,804 B1
(45) Date of Patent: Jan. 9, 2001

(54) OPTICAL DEVICE WITH AT LEAST ONE SWIVELLING OBSERVATION TUBE

(75) Inventors: Manfred Schuck, Munich; Georg Stoeckl, Gröbenzell; Klaus Koch, Puchheim; Alexander Götz, Munich, all of (DE)

(73) Assignee: Rodenstock Prazisionsoptik GmbH, Munich (DE)

( * ) Notice: Under 35 U.S.C. 154(b), the term of this patent shall be extended for 0 days.

(21) Appl. No.: 09/367,631

(22) PCT Filed: Feb. 25, 1998

(86) PCT No.: PCT/DE98/00547

§ 371 Date: Aug. 19, 1999

§ 102(e) Date: Aug. 19, 1999

(87) PCT Pub. No.: WO98/38543

PCT Pub. Date: Sep. 3, 1998

(30) Foreign Application Priority Data

Feb. 25, 1997 (DE) .............................. 197 07 520

(51) Int. Cl.⁷ .............................. G02B 21/00; G02B 21/22
(52) U.S. Cl. .......................... 359/384; 359/368; 359/375; 359/383
(58) Field of Search .................................. 359/362–363, 359/368, 375, 383–384

(56) References Cited

U.S. PATENT DOCUMENTS

| 4,175,826 | * 11/1979 | Blaha et al. | 359/384 |
|---|---|---|---|
| 4,299,439 | * 11/1981 | Stromblad | 359/384 |
| 4,576,450 | 3/1986 | Westphal | 359/384 |
| 4,798,451 | * 1/1989 | Fujiwara | 359/375 |
| 5,177,636 | * 1/1993 | Furuhashi | 359/384 |
| 5,543,962 | 8/1996 | Kitajima et al. | 359/384 |

FOREIGN PATENT DOCUMENTS

| 3117254 A1 | 11/1982 | (DE) . |
|---|---|---|
| 637198 | 5/1950 | (GB) . |

* cited by examiner

Primary Examiner—Thong Nguyen
(74) Attorney, Agent, or Firm—Simpson, Simpson & Snyder, L.L.P.

(57) ABSTRACT

Disclosed is an optical device with at least one lens and at least one swiveling observation tube, exhibiting the following characteristics: The observation tube comprises a base section fixedly connected to the optical device, and an eyepiece carrier which rolls along an arc of a circle so that swiveling can occur on the base section; a first rotatable deflecting mirror whose rotational axis orthogonally intersects the optical axis of an objective lens of the optical device and which is forcibly rotated by the movement of the eyepiece carrier on the base section; a second rotatable deflecting mirror is arranged in the eyepiece carrier and whose rotational axis orthogonally intersects the optical axis as deflected by the first deflecting mirror and which is forcibly rotated by the movement of the eyepiece carrier on the base section.

12 Claims, 4 Drawing Sheets

α = 0 degrees

∝ = +60 degrees

∝ = -60 degrees

OPTICAL DEVICE WITH AT LEAST ONE SWIVELLING OBSERVATION TUBE

CROSS-REFERENCES TO RELATED APPLICATIONS

The present application is the U.S. national phase under 35 U.S.C. 371 of International Application No. PCT/DE98/00547 filed Feb. 25, 1998 claiming priority of German Patent Application No.197 07 520.7 filed Feb. 25, 1997.

BACKGROUND OF THE INVENTION

1. Field of the invention

The invention relates to an optical device with at least one lens and at least one swiveling observation tube.

Such optical devices are, for instance, microscopes and particularly surgical microscopes with two imaging channels for stereoscopic viewing.

2. Description of the Related Art

Optical devices comprising one or two swiveling observation tubes are known from quite a number of prior art references. Just by way of example reference is made to the documents quoted below which, by the way, explicit reference is made to with respect to the explanation of all details or applications which are not mentioned here separately:

German Patent DE 1 098 233, German laid-open Patent Application DE-OS 25 02 209, German Patent DE 26 54 778 C2, German Patent DE 31 05 018 A1, German Patent DE 31 17 254 C2, German Patent DE 33 05 650 A1, German Patent DE 37 18 843 A1, German Utility Model DE-GBM 79 31 427, European Patent EP 0 627 642 A1 and British Patent GB 637 198.

In the device known from the German Patent DE 31 17 254 C2 the observation tube can be swiveled about an axis. A rotatable mirror is disposed with the same axis as the rotational axis of the observation tube, onto which mirror the light beam coming from the lens is deflected by a first mirror fixedly arranged in the base section.

The optical device known from the German Patent DE 31 17 254 C2, which comprises a swiveling observation tube, hence presents disadvantages with respect to both the variability of the viewing direction and the overall length and aperture of the optical system.

The same applies to the optical systems or devices known from the other prior art documents.

BRIEF SUMMARY OF THE INVENTION

The present invention is based on the problem of proposing an optical device comprising at least one lens and at least one swiveling observation tube, which achieves a high variability of the viewing direction of typically ±60°, i.e. 120° in total, with a short overall length and a reduced weight.

The invention starts out from the basic idea that an observation tube with a variable viewing direction could be implemented by the provision that the observation tube is rolled along the arc of a circle on the base section rather than being rotated. With this provision and with the use of two rotatable deflecting mirrors, whereof one is disposed in the base section whilst the other one is arranged in the swiveling eyepiece carrier, it is possible to achieve a wide swiveling angle of up to 120° and more with a short overall length and a reduced weight.

In one preferred embodiment, a swiveling motion of the eyepiece carrier through the angle α causes the first deflecting mirror to rotate through the angle ¼α in a direction towards the eyepiece carrier an the second deflecting mirror through an angle of ¼α relative to the eyepiece carrier in opposition to the swiveling motion of the eyepiece carrier. With this provision the required deflection of the light beam coming from the lens is uniformly distributed to the two deflecting mirrors so that a wide aperture of the observation tube is achieved at a small overall length.

The inventive device permits a wide swiveling range of the eyepiece carrier, which can, in particular, be as wide as ±60° and more.

The inventive principle is, of course, applicable in devices comprising a single observation tube only, i.e. for monocular observation. The inventive principle is particularly expedient, however, in devices which comprise a binocular tube which permits the observation through two separate viewing openings. For reasons of both space and tolerance it makes sense to use the deflecting mirrors in common in both imaging channels.

In another preferred embodiment an optical means is provided which offsets the optical axis of the eyepiece observation opening proper and of the eyepiece carrier downstream of the second deflecting mirror in parallel. With this provision of ergonomic layout is improved. The optical device may comprise two Porro prisms which are preferably rotated through 90° relative to each other. The optical means may also serve to set the pupil distance—in those embodiments in which the Porro prisms are used—by rotation of these prisms. The ergonomic configuration is even further enhanced when the inventive device is rotatable through an angle of 180° or more in a holder which may be an angular dovetail guide, for instance.

For the implementation of the rolling movement of the eyepiece carrier on the base portion preferably rolling gears are provided which mesh with each other. One of the rolling gears—preferably the rolling gear provided on the base portion—may be stationary whilst the other rolling gear is rotating.

In accordance with another preferred embodiment, gearing means are provided which rotate the deflecting mirrors in correspondence with the swiveling motion of the eyepiece carrier. These gearing means may be driven particularly by one of the rolling gears.

For a reduction of the tolerances and clearances the rolling gears may be provided on both sides of the eyepiece carrier or the base section, respectively. It is moreover preferred to provide a biasing means which biases the rotational axes of the deflecting mirrors in a direction toward their shortest spacing as with this provision, too, the clearance is reduced.

BRIEF DESCRIPTION OF THE SEVERAL VIEWS OF THE DRAWINGS

The invention will now be described in the following, without any restriction to the general inventive idea, by exemplary embodiments with reference to the drawing which explicit reference is made to with respect to the disclosure of all inventive details which are not explained in more details in the text in all other respects, in the drawing.

DETAILED DESCRIPTION OF THE INVENTION

Figure 1:
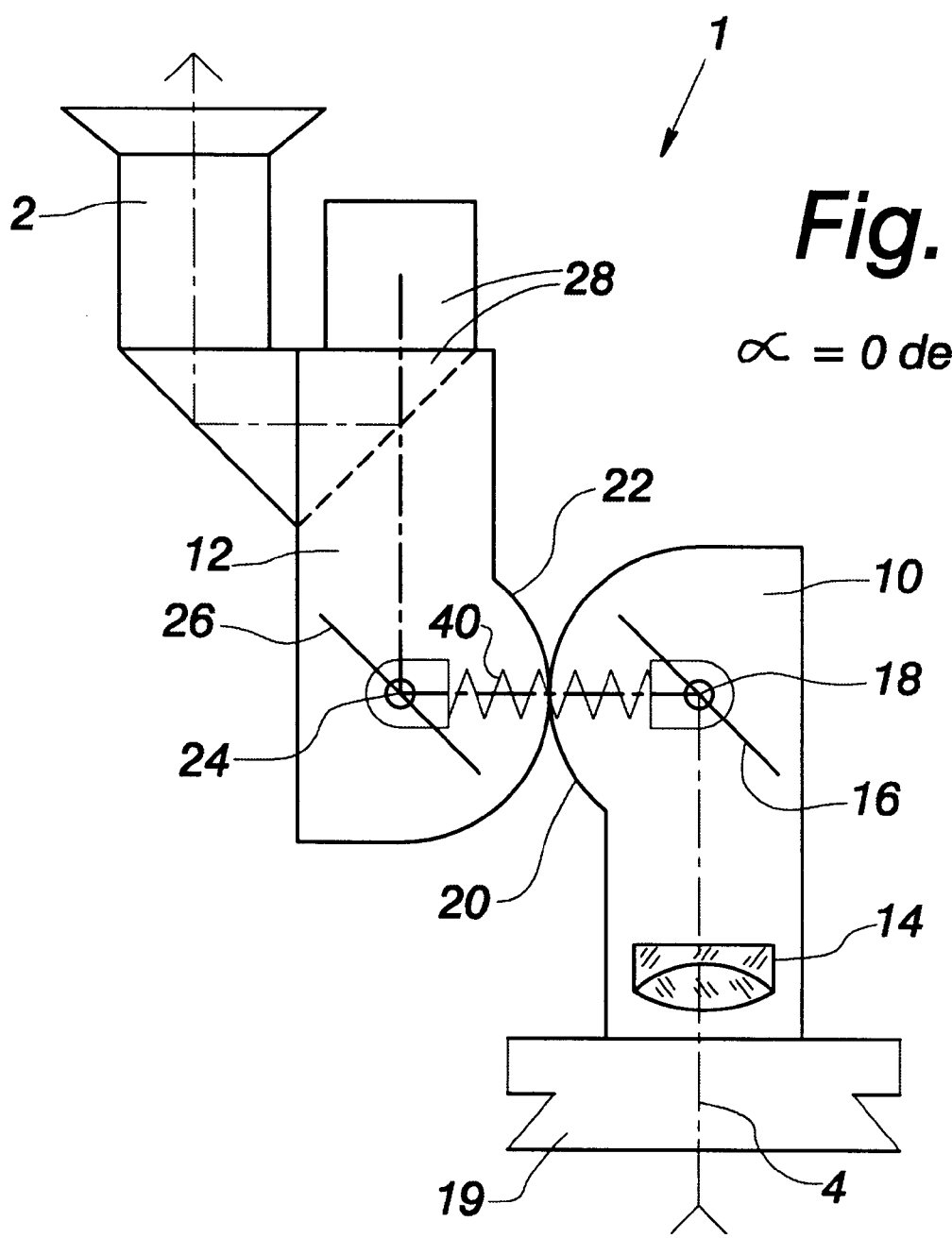
FIG. 1 is a schematic view of an optical device having an observation tube in an intermediate tilt position.

FIG. 1 shows an inventive optical device 1 in the basic position, i.e. in the position in which the eyepiece is oriented "vertically" upwards. The inventive device 1 presents a base section 10 and a swiveling eyepiece carrier 12.

In the base section 10 a lens 14 as well as a rotatable deflecting mirror 16 are provided. The deflecting mirror 16 can be rotated about an axis 18 which is orthogonal on an optical axis 4 of the lens 14. Moreover, the base section 10 is rotatable by means of an annular dovetail 19 adapted for receipt within an annular dovetail guide through 180° about the optical axis 4 of the lens 14.

Figure 2:
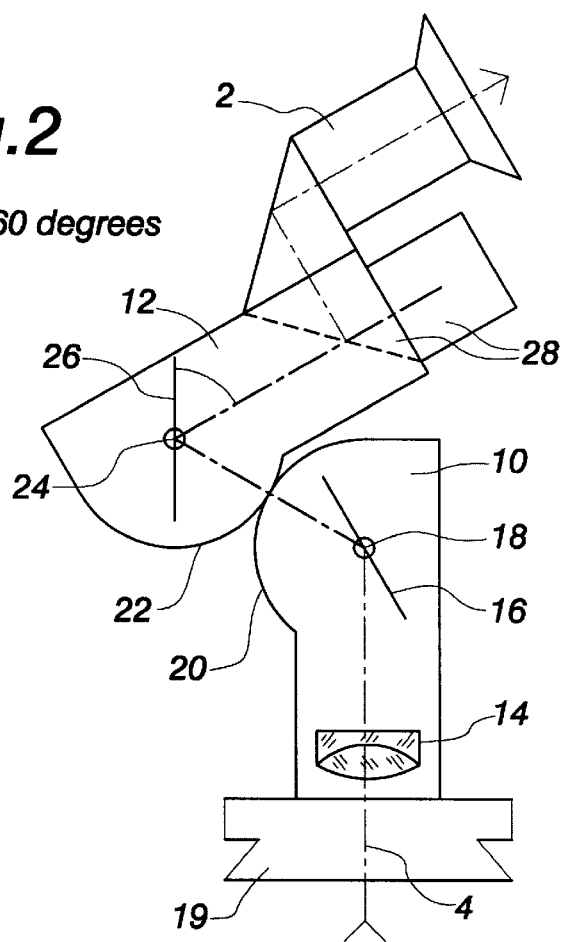
FIG. 2 is a schematic view similar to that of FIG. 1, however the observation tube is shown at a positive tilt position.
Figure 3:
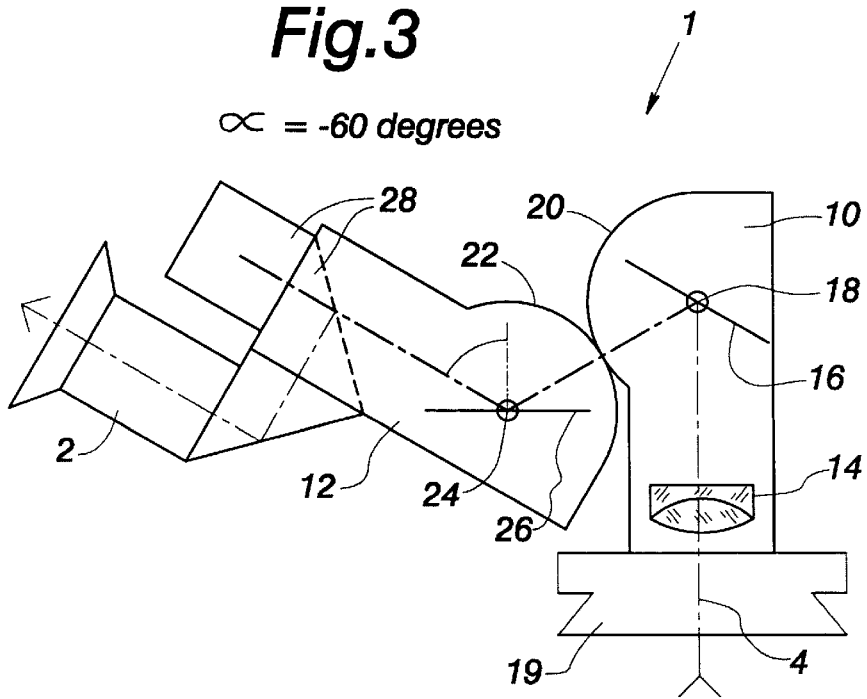
FIG. 3 is a schematic view similar to that of FIG. 1, however the observation tube is shown at a negative tilt position.

The eyepiece carrier 12 is adapted to be rolled on the base section 10 along the arc of a circle so as to realize the swiveling motion. More specifically, as seen in FIGS. 1–3, eyepiece carrier 12 includes on its outer surface a rolling zone 22 arranged to roll along an arc provided by an opposite rolling zone 20 on an outer surface of base section 10. The radius of curvature of the outer surface of base section 10 and that of the outer surface of eyepiece carrier 12 along which rolling occurs are preferably equal. For the implementation of the rolling movement of the eyepiece carrier on the base portion, rolling zones 20 and 22 are preferably formed as rolling gears which mesh with each other. One of the rolling gears—preferably the rolling gear provided on base section 10—may be stationary whilst the other rolling gear is rotating. The FIGS. 2 and 3 show the eyepiece carrier 12 in the positions +60° and −60° relative to the original position illustrated in FIG. 1.

A second deflecting mirror 26 is provided in the eyepiece carrier 12, which is rotatable about an axis of rotation 24 which is orthogonal on the optical axis 4 of the lens 14 after deflection of the optical axis 4 by the first deflecting mirror 16. Moreover, the eyepiece carrier 12 comprises two Porro prisms 28 which serve to erect the image and to adjust the pupil distance.

In the embodiment illustrated here the first deflecting mirror 16 is rotated through an angle of ¼α in a direction towards the eyepiece carrier 12 whilst the second deflecting mirror 26 is rotated through an angle of ¼α relative to the eyepiece carrier 12 in opposition to the swiveling motion of the eyepiece carrier when the eyepiece carrier is pivoted through the angle α. Thus in FIG. 2 the first deflecting mirror 16 is rotated clockwise about axis 18 and the second deflecting mirror 26 is rotated counterclockwise about axis 24, and in FIG. 3 the first deflecting mirror 16 is rotated counterclockwise about axis 18 and the second deflecting mirror 26 is rotated clockwise about axis 24.

It is moreover preferred to provide a biasing means, for example a spring 40, arranged to bias rotational axes 18 and 24 of the deflecting mirrors in a direction toward their shortest spacing as with this provision the clearance is reduced.

Figure 4:
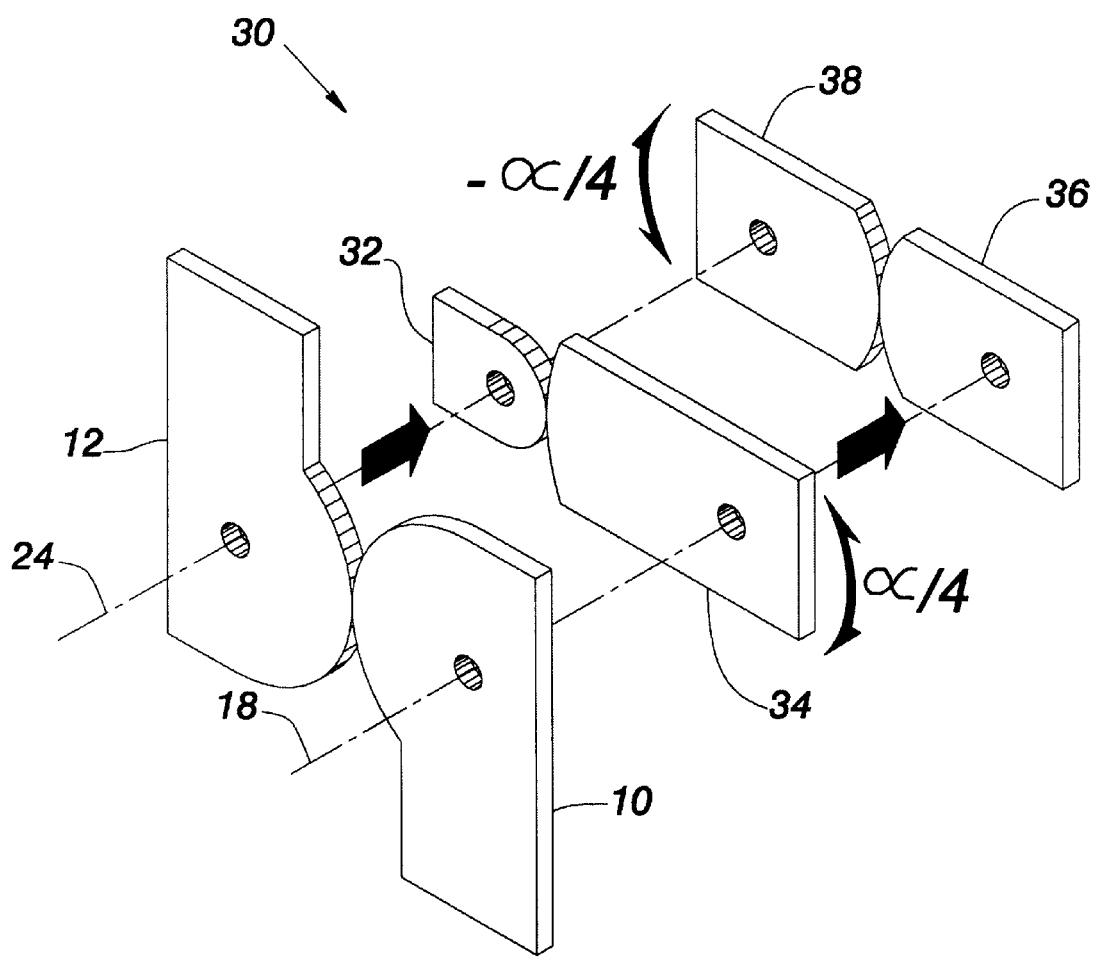
FIG. 4 is a schematic view of a possible gearing system for use in the present invention.

FIG. 4 shows a possible gear system 30 for achieving the aforementioned rotations of first deflecting mirror 16 and second deflecting mirror 26. Gear system 30 includes a first drive gear 32 rotatably mounted on axis 24 and coupled to rotate with eyepiece carrier 12; a first driven gear 34 rotatably mounted on axis 18 and meshed with first drive gear 32. First drive gear 32 and first driven gear 34 have a one-quarter gear ratio such that rotation of the first drive gear through an angle α produces a counter rotation in first driven gear 34 of ¼α, and first deflecting mirror 16 is coupled for rotation with first driven gear 34. Gear system 30 further includes a second drive gear 36 rotatably mounted on axis 18 and coupled to rotate with first driven gear 34, and a second driven gear 38 rotatably mounted on axis 24 and meshed with second drive gear 36. Second drive gear 36 and second driven gear 38 have a one-to-one gear ratio such that second driven gear 38 rotates by ¼α in an opposite angular direction from first driven gear 34 (second driven gear rotates by −¼α). Second deflecting mirror 26 is coupled for rotation with second driven gear 38. While FIG. 4 shows one possible gear system that is readily apparent to persons of ordinary skill in the art for producing the desired rotations of first deflecting mirror 16 and second deflecting mirror 26, other gear systems having different specific arrangements are of course possible.

Figure 5:
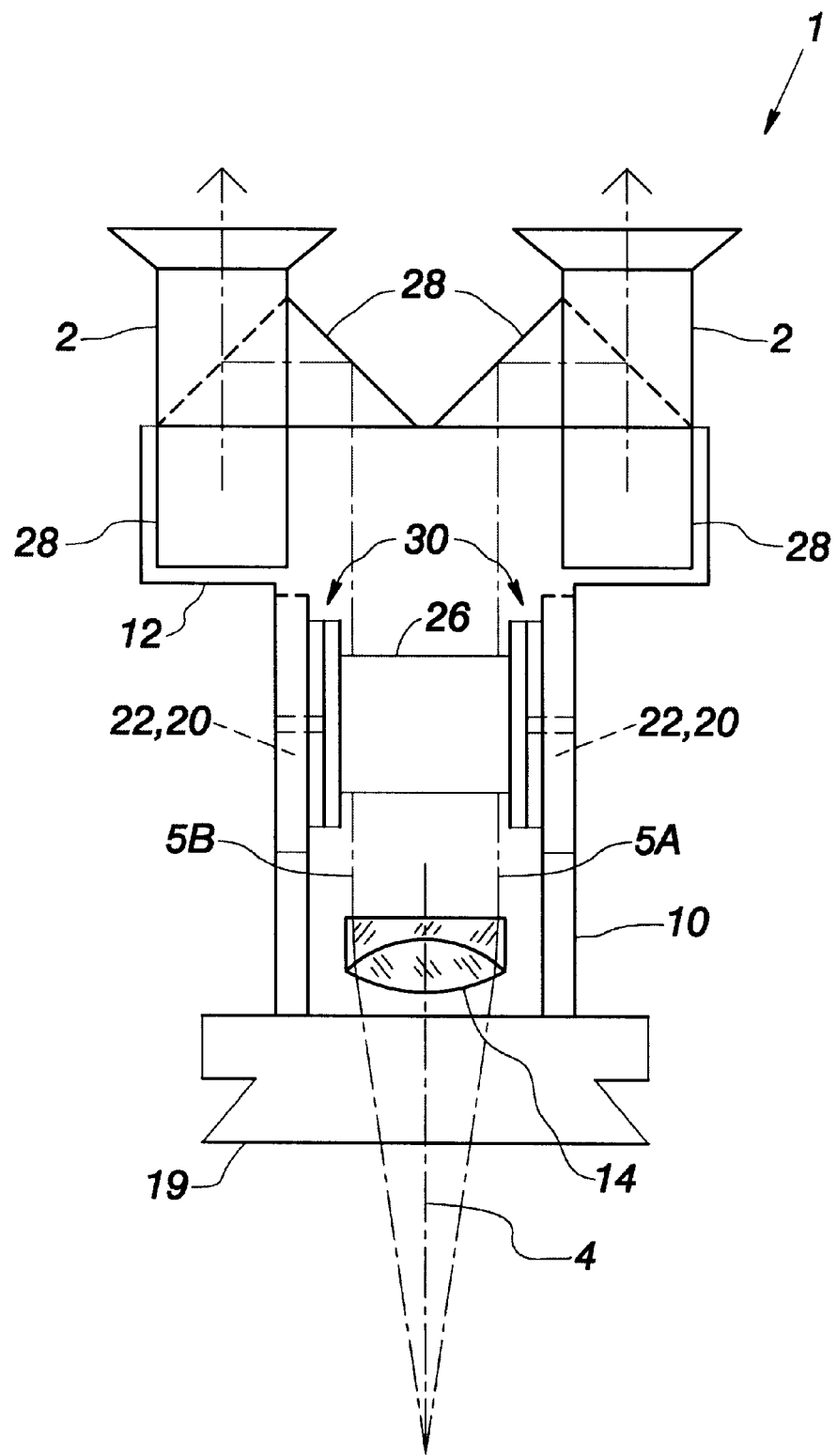
FIG. 5 is a frontal schematic view of the optical device of the present invention.

FIG. 5 is a frontal schematic view of optical device 1 showing the device embodied as a binocular device having a pair of optical paths 5A and 5B. Mirrors 16 and 26 are each sized to receive and reflect light traveling along both optical paths 5A an 5B, with only mirror 26 being visible in FIG. 5.

What is claimed is:

1. An optical observation device comprising:

a base section having a lens accommodated therein along a lens axis, a first axis of rotation extending through said base section and oriented orthogonally to said lens axis, a first mirror mounted for rotation about said first axis of rotation, and an outer surface cylindrically curved about said first axis of rotation;

an eyepiece section having an eyepiece accommodated therein, a second axis of rotation extending through said eyepiece section and oriented parallel to said first axis, a second mirror mounted for rotation about said second axis of rotation, and an outer surface cylindrically curved about said second axis of rotation;

said outer surface of said eyepiece section being arranged in rolling surface engagement with said outer surface of said base section to permit swiveling motion of said eyepiece section relative to said base section for varying an observation angle of said eyepiece through a swivel angle; and a gearing system for rotating said second mirror about said second axis of rotation by a fraction of said swivel angle to follow said swiveling of said eyepiece section about said second axis of rotation, and for rotating said first mirror about said first axis of rotation by said fraction of said swivel angle to follow said swiveling of said eyepiece section about said first axis of rotation.

2. The optical observation device according to claim 1, wherein said observation angle of said eyepiece can be varied through a range up to 120°.

3. The optical observation device according to claim 1, wherein said device is binocular having a pair of optical paths, and said first and second mirrors each receive and reflect light traveling along said pair of optical paths.

4. The optical observation device according to claim 1, wherein said eyepiece section is binocular having a pair of optical paths, and said eyepiece section includes a pair of rotatable Porro prisms for adjusting a pupil distance between said pair of optical paths.

5. The optical observation device according to claim 1, wherein said base section is adapted to be supported in an annular dovetail guide permitting for rotation of said base section about said lens axis.

6. The optical observation device according to claim 1, further comprising at least one rolling gear on said base section and an associated rolling gear on said eyepiece section for assisting rolling motion of said eyepiece section on said base section.

7. The optical observation device according to claim 6, wherein a pair of rolling gears are provided on said base section at opposite sides of said lens axis and are stationary.

8. The optical observation device according to claim 6, wherein said gearing system includes a gear set driven by said rolling gear on said eyepiece section for rotating said first and second mirrors.

9. The optical observation device according to claim 1, wherein said gearing system includes a gear set connected to said eyepiece section for rotating said first and second mirrors.

10. The optical observation device according to claim 1, further comprising biasing means for biasing said first and second axes of rotation in a direction towards their shortest distance of separation.

11. The optical observation device according to claim 1, wherein said outer surface of said base section and said outer surface of said eyepiece section have the same radius of curvature.

12. The optical observation device according to claim 1, wherein said first and second mirrors are mechanically biased to avoid play.

* * * * *